(12) United States Patent
Hurt

(10) Patent No.: US 10,803,723 B2
(45) Date of Patent: Oct. 13, 2020

(54) SAFETY APPARATUS FOR A WATER BODY

(71) Applicant: Darryl L Hurt, Carlsbad, CA (US)

(72) Inventor: Darryl L Hurt, Carlsbad, CA (US)

(*) Notice: Subject to any disclaimer, the term of this patent is extended or adjusted under 35 U.S.C. 154(b) by 0 days.

(21) Appl. No.: 16/454,957

(22) Filed: Jun. 27, 2019

(65) Prior Publication Data

US 2019/0318603 A1 Oct. 17, 2019

(51) Int. Cl.
| | | |
|---|---|---|
| G08B 23/00 | (2006.01) | |
| G08B 21/08 | (2006.01) | |
| G06F 16/75 | (2019.01) | |
| G08B 1/08 | (2006.01) | |
| G06T 7/246 | (2017.01) | |
| B63B 22/00 | (2006.01) | |

(52) U.S. Cl.
CPC ............ *G08B 21/08* (2013.01); *G06F 16/75* (2019.01); *G06T 7/248* (2017.01); *G08B 1/08* (2013.01); *B63B 2022/006* (2013.01); *B63B 2201/00* (2013.01)

(58) Field of Classification Search
CPC .......... G08B 21/08; G08B 1/08; G06T 7/248; G06F 16/75; B63B 2022/006; B63B 2201/00
See application file for complete search history.

(56) References Cited

U.S. PATENT DOCUMENTS

| | | | | |
|---|---|---|---|---|
| 6,583,724 B1* | 6/2003 | Rodriguez | ............ | G08B 21/082 340/522 |
| 7,019,649 B2* | 3/2006 | Hoenig | ................. | G08B 21/082 340/566 |
| 7,681,436 B2* | 3/2010 | Biberger | ................ | G01N 33/18 73/53.01 |
| 9,508,242 B2* | 11/2016 | Podlisker | ............. | G08B 29/183 |
| 9,928,719 B1* | 3/2018 | Webb | .................... | G08B 21/084 |
| 10,024,578 B1* | 7/2018 | Rutkai | .................... | E04H 4/129 |
| 2004/0208499 A1* | 10/2004 | Grober | ................... | B63B 29/12 396/428 |
| 2005/0220169 A1* | 10/2005 | McGowan-Scanlon | | G01K 1/14 374/156 |
| 2005/0279677 A1* | 12/2005 | Lin | .......................... | C02F 1/76 210/96.1 |
| 2006/0292043 A1* | 12/2006 | Biberger | ................ | G01N 33/18 73/53.01 |
| 2007/0154319 A1* | 7/2007 | Stiles, Jr. | ............. | F04D 15/0066 417/42 |

(Continued)

*Primary Examiner* — Quang Pham

(74) *Attorney, Agent, or Firm* — Barry Choobin; Patent 360

(57) ABSTRACT

The various embodiments herein provide a safety device for anticipating and detecting a potential incident in a water body. The safety device comprises a sensor unit, a processing unit, a data transceiver and a computer readable program. The sensor unit is installed over a surface of the safety device to monitor a human and a water vehicle activity and assess a water condition in a device's vicinity. The processing unit is a core module connected to the sensor unit within a housing to receive, process and transmit a data in a real time. The data transceiver is connected to the processing unit through a bidirectional channel to a monitoring authority. The computer readable program is installed in the safety device and runs over the processing unit. The computer readable program acts as an interface between the safety device and the monitoring authorities.

6 Claims, 4 Drawing Sheets

(56) References Cited

U.S. PATENT DOCUMENTS

| | | | |
|---|---|---|---|
| 2014/0228649 A1* | 8/2014 | Rayner | A61B 5/6898 |
| | | | 600/301 |
| 2015/0161870 A1* | 6/2015 | Podlisker | G08B 21/08 |
| | | | 340/573.6 |
| 2016/0259348 A1* | 9/2016 | Lewis | G05D 21/02 |
| 2017/0092096 A1* | 3/2017 | Fernandes | E04H 4/00 |
| 2017/0167151 A1* | 6/2017 | Segal | B63C 9/02 |
| 2017/0248568 A1* | 8/2017 | Yizhack | G01J 3/42 |
| 2017/0365150 A1* | 12/2017 | Bennett | H04L 67/12 |
| 2018/0040223 A1* | 2/2018 | Bodi | G08B 21/086 |
| 2018/0191390 A1* | 7/2018 | Barry | H04W 4/42 |
| 2019/0087548 A1* | 3/2019 | Bennett | G05D 1/0297 |
| 2019/0096085 A1* | 3/2019 | Ueda | G06T 7/12 |
| 2020/0029532 A1* | 1/2020 | Janakiraman | A61H 3/061 |

* cited by examiner

SAFETY APPARATUS FOR A WATER BODY

BACKGROUND

Technical Field of Invention

The embodiments herein generally relate to a safety apparatus and particularly relates to a safety apparatus for a small as well as a large water body. The embodiments herein more particularly relate to an apparatus for monitoring and identifying a potentially life-threatening situation and generating an alert for facilitating rescue operation.

Description of Related Art

Pool drownings (particularly small children) continue to be a major problem for many countries in the world. In recent history, many methods and devices have been invented to mitigate or reduce the number of drownings that occur. While some of these devices work as intended, almost all have drawbacks related to false alarms. These false alarms usually lead to pool owners disabling the devices. One of the main problems inherent with most of these devices is related to weather conditions such as wind.

To prevent such incidents a plurality of prior arts are introduced. One of such prior arts discloses a network of modular, multitier pool mobile units, that wander around and under water of a swimming pool. The pool mobile units monitor for safety, emergency and incident related events and undertakes appropriate actions, scrub and clean the swimming pool, emit chemical agents to sanitize the swimming pool water, and may play music. The pool mobile units may simply operate on the pool surface, be fully submersible, or semisubmersible.

However, the prior arts are primarily installed on the perimeter of a water body and works mostly as a warning device and not a hazard prevention device. also, few prior art devices placed within the water bodies are restricted to small water bodies like swimming pool and also, fails to predict an incident and adequately alert the authorities.

In the view of foregoing, there is a need for a safety apparatus for water bodies with an incident prediction and warning mechanism. Also, there is a need for a safety apparatus with versatile installation ability near and in the water bodies.

SUMMARY OF THE INVENTION

The primary objective of the present invention is to provide a safety apparatus for water bodies with an incident prediction and warning mechanism.

Another objective of the present invention is to provide a safety apparatus with versatile installation ability near and in the water bodies.

Yet another objective of the present invention is to provide a computer readable program installed on the safety device for communicating a distress alert and sharing a situation details to concerned authorities.

The various embodiments herein provide a safety device for anticipating and detecting a potential incident in a water body. The safety device comprises a sensor unit, a processing unit, a data transceiver and a computer readable program. The sensor unit is installed over a surface of the safety device to monitor a human and a water vehicle activity and assess a water condition in a device's vicinity. The processing unit is a core module connected to the sensor unit within a housing to receive, process and transmit a data in a real time. The data transceiver is connected to the processing unit through a bidirectional channel to a monitoring authority. The computer readable program is installed in the safety device and runs over the processing unit. The computer readable program acts as an interface between the safety device and the monitoring authorities.

According to one embodiment herein, the sensor unit comprises an imaging unit, a temperature sensor, a chemical analyser and a pressure sensor.

According to one embodiment herein, a real time data is communicated from the sensor unit to the processing unit, wherein the data comprises a real time image, a real time video, a water surface temperature, a water flow rate and a chemical composition in water.

According to one embodiment herein, the real time image and video data is analysed by the processing unit and a matched with a reference data comprising an incidental scenario data.

According to one embodiment herein, the processed data is collated with the water surface temperature, the water flow rate and the chemical composition in water to assess a drowning scenario matching the reference data.

According to one embodiment herein, the housing is made of dynamic air pressurized chamber for dynamically floating as well as submerging in water.

According to one embodiment herein, the housing comprises a plurality of anchors for stabilizing a position of the safety device in water and on land.

According to one embodiment herein, the computer readable program implements an artificial intelligence on a data processed by the processing unit to predict a potential drowning incident.

According to one embodiment herein, the processing unit generates a distress beacon and also sends a real time sensor data to the monitoring authorities on positively identifying a drowning incident.

According to one embodiment herein, the safety device is able to float over the water surface, semi-submerged or fully submerged under the water as per a requirement of a user.

The embodiments herein provide a method for detecting a potential drowning incident in a water body through a safety device. The safety device gathers a plurality of images through an imaging unit installed in the safety device and identifies a plurality of markers in the gathered plurality of images. Then, the identified markers are matched with a reference data saved in a database of a processing unit installed in the safety device. On successful matching, the plurality of images along with an alert notification are sent to a monitoring authority through a computer readable program on successful matching and a distress beacon is generated along with sending a plurality of sensor data to the monitoring authority. The sensor data is generated by a sensor unit in the safety device.

According to one embodiment herein, the sensor data comprises a water surface temperature, a water flow rate and a chemical composition in water.

The embodiments herein provide a method for predicting a potential drowning incident in a water body through an artificial intelligence driven safety device comprising the steps of:

a) gathering a plurality of images of a human activity and a water vehicle activity through an imaging unit installed in the safety device;

b) gathering a plurality of sensor data through a sensor unit in the safety device;

c) identifying a plurality of markers in the gathered plurality of images;

d) matching the identified markers collated with the plurality of sensor data saved in a database with a reference data of a processing unit installed in the safety device;

e) predicting a potential drowning incident on positive matching of the marker with the reference data;

f) generating an audible alert beacon for the human and water vehicles present in vicinity; and g) sending the plurality of sensor data and images to the monitoring authority.

These and other aspects of the embodiments herein will be better appreciated and understood when considered in conjunction with the following description and the accompanied drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanied drawings in which.

DETAILED DESCRIPTION OF THE DRAWINGS

In the following detailed description, a reference is made to the accompanied drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
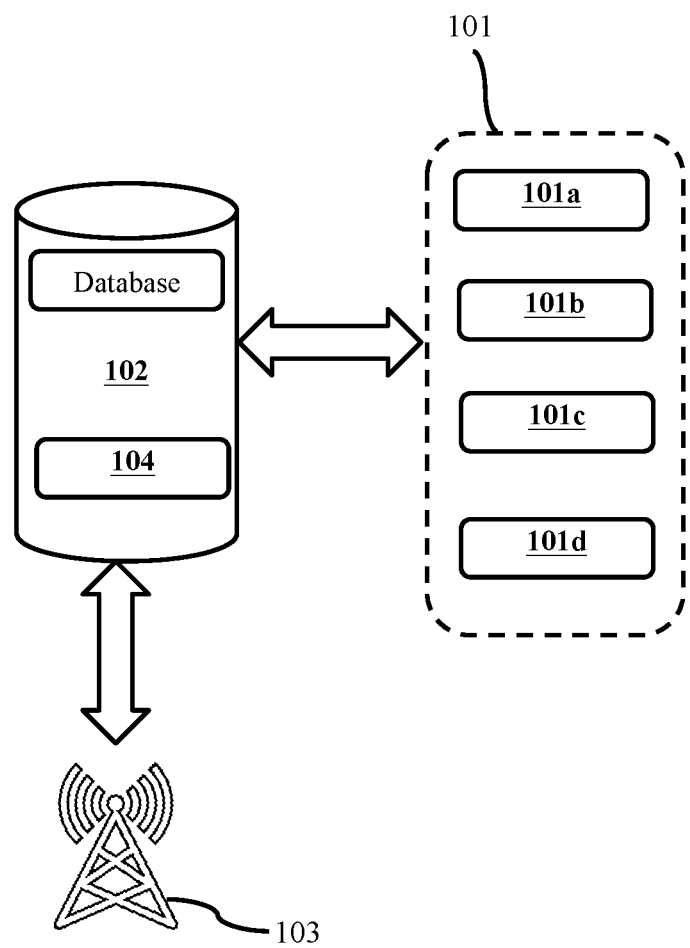
FIG. 1 illustrates a block diagram of a safety apparatus for a water body, according to one embodiment herein.

FIG. 1 illustrates a block diagram of a safety apparatus for a water body, according to one embodiment herein. With respect to FIG. 1, the safety device 100 comprises a sensor unit 101, a processing unit 102, a data transceiver 103 and a computer readable program 104. The sensor unit 101 is installed over a surface of the safety device 100 to monitor a human, animal and a water vehicle activity and assess a water condition in a device's vicinity. The sensor unit 101 comprises an imaging unit 101a, a temperature sensor 101b, a chemical analyser 101c and a pressure sensor 101d. The processing unit 102 is a core module connected to the sensor unit 101 within a housing to receive, process and transmit a data in a real time. The data transceiver 103 is connected to the processing unit 102 through a bidirectional channel to a monitoring authority. The computer readable program 104 is installed in the safety device 100 and runs over the processing unit 102. The computer readable program 104 acts as an interface between the safety device and the monitoring authorities. The computer readable program 104 implements an artificial intelligence (AI) to predict and identify a drowning or potentially drowning incident. The (AI) uses an analytical model and a predictive model to provide the results. The safety device components comprise sensor unit 101, the processing unit 102, and the data transceiver 103 are packaged into a housing. The housing comprises an inner compartment to house the safety device components, a pressurized chamber for filling an air and water to facilitate a floating and submerging ability to the safety device and an anchor. The anchor is attached to an outer surface of the housing for stabilizing the safety device in water body and on land (as shown in FIG. 2b). The safety device components and the housing are powered by a rechargeable battery panel provided with in the housing.

Figure 2A:
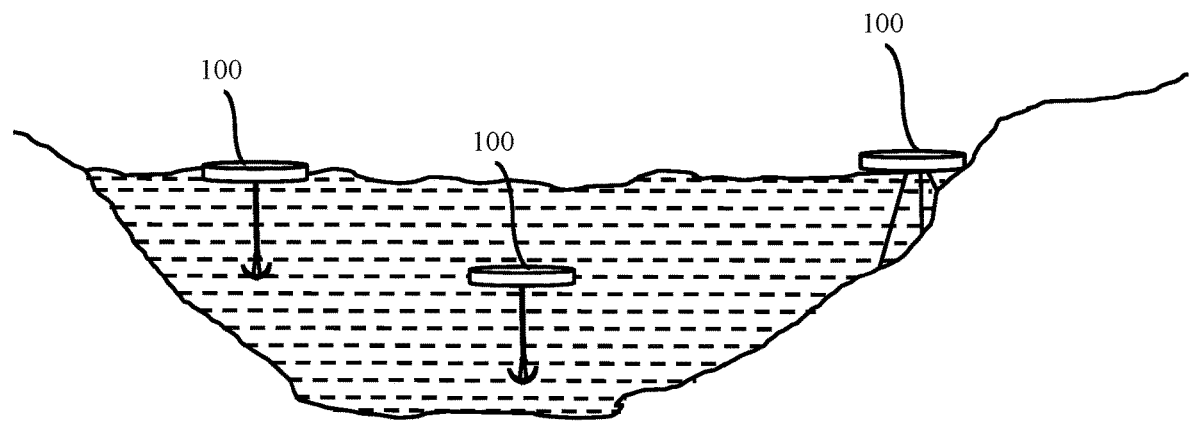
FIGS. 2a and 2b illustrates a placement of the safety apparatus in the water body and a communication architecture during an alert generation respectively, according to one embodiment herein.
Figure 2B:
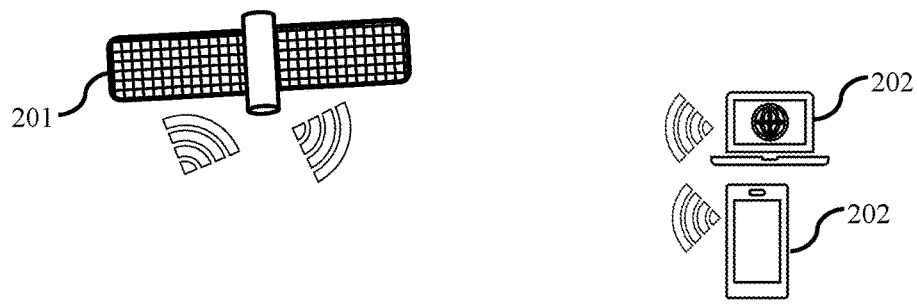
Figure 2B:
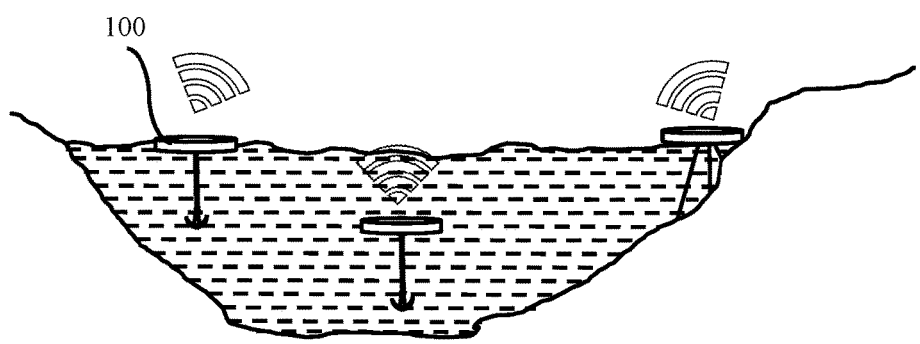

As shown in FIG. 2a, a communication architecture in the safety device 100 utilizes a satellite unit 201 and a plurality of computing devices 202. The data transceiver 103 in the safety device receives a processed data for a potential drowning incident from the processing unit and sends the data in real time to the satellite unit 201 with a video feed. The satellite unit 201 relays the received processed data and the video feed to the plurality of computing devices 202 as a notification or an alert.

According to an embodiment herein, the safety device is configurable with a pedal assembly controlled through the processing unit. The monitoring authority is facilitated to control a movement of the safety device through the computer readable program. The computer readable program a real time directional feed to the monitoring authority received from the processing unit and a monitoring authority activates the pedal unit for moving the floating safety device towards a drowning victim to provide an immediate support till a rescue team or the monitoring authority arrives.

Figure 3:
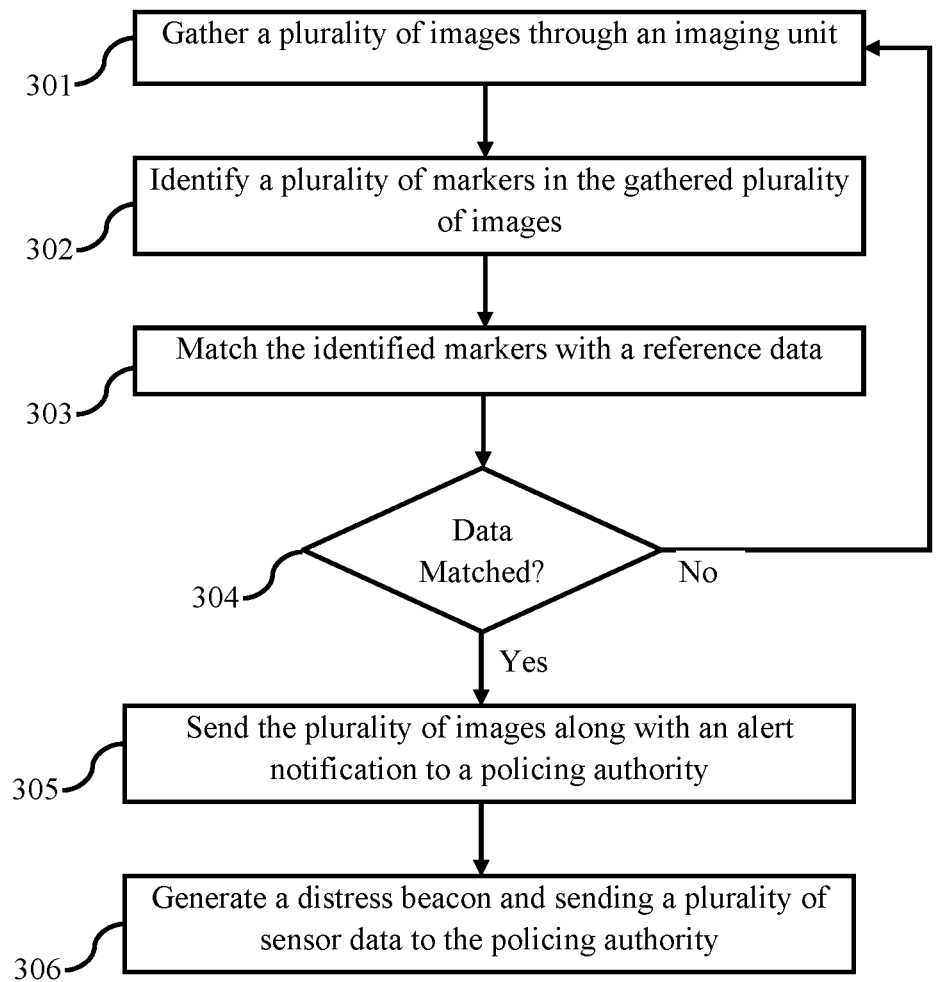
FIG. 3 illustrates a flowchart for a method for detecting a potential drowning incident in a water body through a safety device, according to one embodiment herein.

FIG. 3 illustrates a flowchart for a method for detecting a potential drowning incident in a water body through a safety device, according to one embodiment herein. With respect to FIG. 3, the safety device gathers a plurality of images through an imaging unit installed in the safety device (301) and identifies a plurality of markers in the gathered plurality of images (302). Then, the identified markers are matched with a reference data saved in a database of a processing unit installed in the safety device (303). On successful matching, the plurality of images along with an alert notification are sent to a monitoring authority through a computer readable program on successful matching and a distress beacon is generated along with sending a plurality of sensor data to the monitoring authority (304 & 305). The sensor data is generated by a sensor unit in the safety device (306). On unsuccessful matching, the processed data is scrapped, and the safety device continues to monitor the water condition and a human and water vehicle activity.

Figure 4:
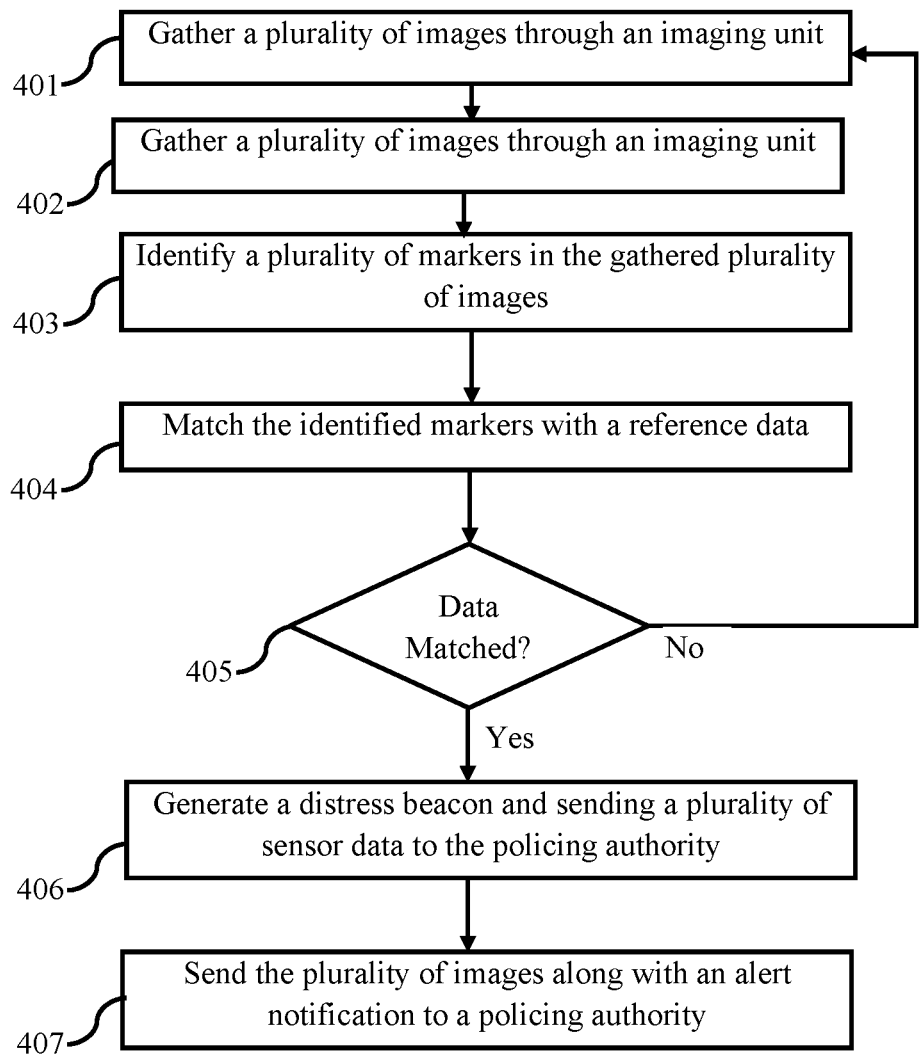
FIG. 4 illustrates a flowchart for a method for predicting a potential drowning incident in a water body through an artificial intelligence driven safety device, according to one embodiment herein.

FIG. 4 illustrates a flowchart for a method for predicting a potential drowning incident in a water body through an artificial intelligence driven safety device, according to one embodiment herein. With respect to FIG. 4, the method comprises gathering a plurality of images of a human activity and a water vehicle activity through an imaging unit installed in the safety device (401). Simultaneously, a plurality of sensor data is gathered through a sensor unit in the safety device (402). The processing unit identifies a plurality of markers in the gathered plurality of images (403) and matches the identified markers collated with the plurality of sensor data saved in a database with a reference data of a processing unit installed in the safety device (404). The processing unit predicts a potential drowning incident on positive matching of the marker with the reference data (405) and generates an audible alert beacon for the human and water vehicles present in vicinity to caution nearby public and water vehicles (406). The processing unit further sends the plurality of sensor data and images to the monitoring authority through a data transceiver unit (407).

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

I claim:

1. A safety device for anticipating, and detecting a potential incident in a water body comprising:
    a sensor unit, wherein the sensor unit is installed over a surface of the safety device, the sensor unit comprises an imaging unit to capture activity of human or a water vehicle in the safety device's vicinity;
    a housing including a dynamic air pressurized chamber to be filled with an air and water to facilitate a floating and submerging of the safety device and an anchor coupled to the housing to stabilize the safety device in the water body
    a pedal unit included in the housing for moving the safety device in or on the water body;
    a processing unit, wherein the processing unit is connected to the sensor unit, the processing unit to:
    receive a plurality of images from the imaging unit,
    identify a plurality of markers in the plurality of images,
    determine a potential drowning event based on a comparison of the plurality of markers with a reference data stored in a database on the processing unit,
    generate a distress alert in response to said determine of the potential drowning event based on a positive match between the plurality of markers with the reference data,
    receive a directional feed from a monitoring authority, and
    in real-time, control the pedal unit based on the directional feed to move the floating safety device towards a drowning victim of the potential drowning event to provide an immediate support; and
    a data transceiver connected to the processing unit for transmitting one or more of the plurality of images along with the distress alert through a bidirectional channel to the monitoring authority;
    wherein the sensor unit, the processing unit and the data transceiver are packed into the housing.

2. The safety device as claimed in claim 1, wherein the sensor unit further comprises a temperature sensor, a chemical analyser, and a pressure sensor.

3. The safety device as claimed in claim 2, wherein a real time data is communicated from the sensor unit to the processing unit, wherein the real time data comprises a real time image, a real time video, a water surface temperature, a water flow rate and a chemical composition in water.

4. The safety device as claimed in claim 3, wherein the real time data is processed by the processing unit, and the processed data is collated with the water surface temperature, the water flow rate and the chemical composition of the water to access the drowning event matching the reference data.

5. A method for detecting a potential drowning incident in a water body through a safety device, the safety device comprising a housing including a dynamic air pressurized chamber to be filled with an air and water to facilitate a floating and submerging of the safety device, a sensor unit comprising an imaging unit to capture activity of human or a water vehicle in the safety device's vicinity, an anchor coupled to the housing to stabilize the safety device in the water body, a pedal unit in the housing, a processing unit, and a data transceiver connected to the processing unit for transmitting data through a bidirectional channel to a monitoring authority, the method comprising the steps of:
    gathering, by the processing unit, a plurality of images through the imaging unit installed in the safety device;
    identifying, by the processing unit, a plurality of markers in the gathered plurality of images;
    matching, by the processing unit, the identified markers with a reference data saved in a database of the processing unit installed in the safety device;
    detecting, by the processing unit, a potential drowning incident in the water body in response to the match;
    sending, by the processing unit via the data transceiver, the plurality of images along with an alert notification to a monitoring authority in response to the match; and
    generating, by the processing unit via the data transceiver, a distress beacon;
    receiving, by the processing unit via the data transceiver, a directional feed from the monitoring authority; and
    controlling, by the processing unit, the pedal unit based on the directional feed for moving the floating safety device towards a drowning victim of the potential drowning event to provide an immediate support and
    wherein the sensor unit, the processing unit and the data transceiver are packed into the housing.

6. The method as claimed in claim 5, wherein the sensor unit further comprises a temperature sensor, a chemical analyzer, a pressure sensor, and the method further comprising the steps of
    gathering sensor data, by the processing unit, the sensor data comprises a water surface temperature, a water flow rate, and a chemical composition in water; and
    verifying, by the processing unit, the plurality of markers based on the sensor data, wherein detecting the potential drowning event further depends on the sensor data.

* * * * *